United States Patent [19]
ab der Halden

[11] Patent Number: 4,580,291
[45] Date of Patent: Apr. 1, 1986

[54] METHOD FOR PROCESSING DIGITAL SIGNALS, AND SUBSCRIBER STATION FOR TELECOMMUNICATION AND TELEDISTRIBUTION

[75] Inventor: Charles H. G. ab der Halden, Paris, France

[73] Assignee: Societe Anonyme de Telecommunications, Paris, France

[21] Appl. No.: 558,044

[22] Filed: Dec. 5, 1983

[30] Foreign Application Priority Data

Dec. 6, 1982 [FR] France .................. 82 20369

[51] Int. Cl.[4] ............................... H04B 9/00
[52] U.S. Cl. ........................ 455/606; 455/612
[58] Field of Search ............. 455/2, 3, 4, 5, 606, 455/607, 612; 358/84, 85

[56] References Cited

U.S. PATENT DOCUMENTS

| | | | |
|---|---|---|---|
| 3,668,307 | 6/1972 | Face et al. | 455/5 |
| 4,395,780 | 7/1983 | Gohm et al. | 455/607 |
| 4,441,180 | 4/1984 | Schussler | 455/607 |

*Primary Examiner*—Joseph A. Orsino, Jr.
*Attorney, Agent, or Firm*—A. W. Breiner

[57] ABSTRACT

A subscriber station receives and transmits, through two optical fibers, composite signals representative of various services as television signals, videophone signals, hifi sound signals, telephone signals, etc. The station controls exchanges between a switching center and terminals, and separates some signals from composite signals to process specific signals.

15 Claims, 16 Drawing Figures

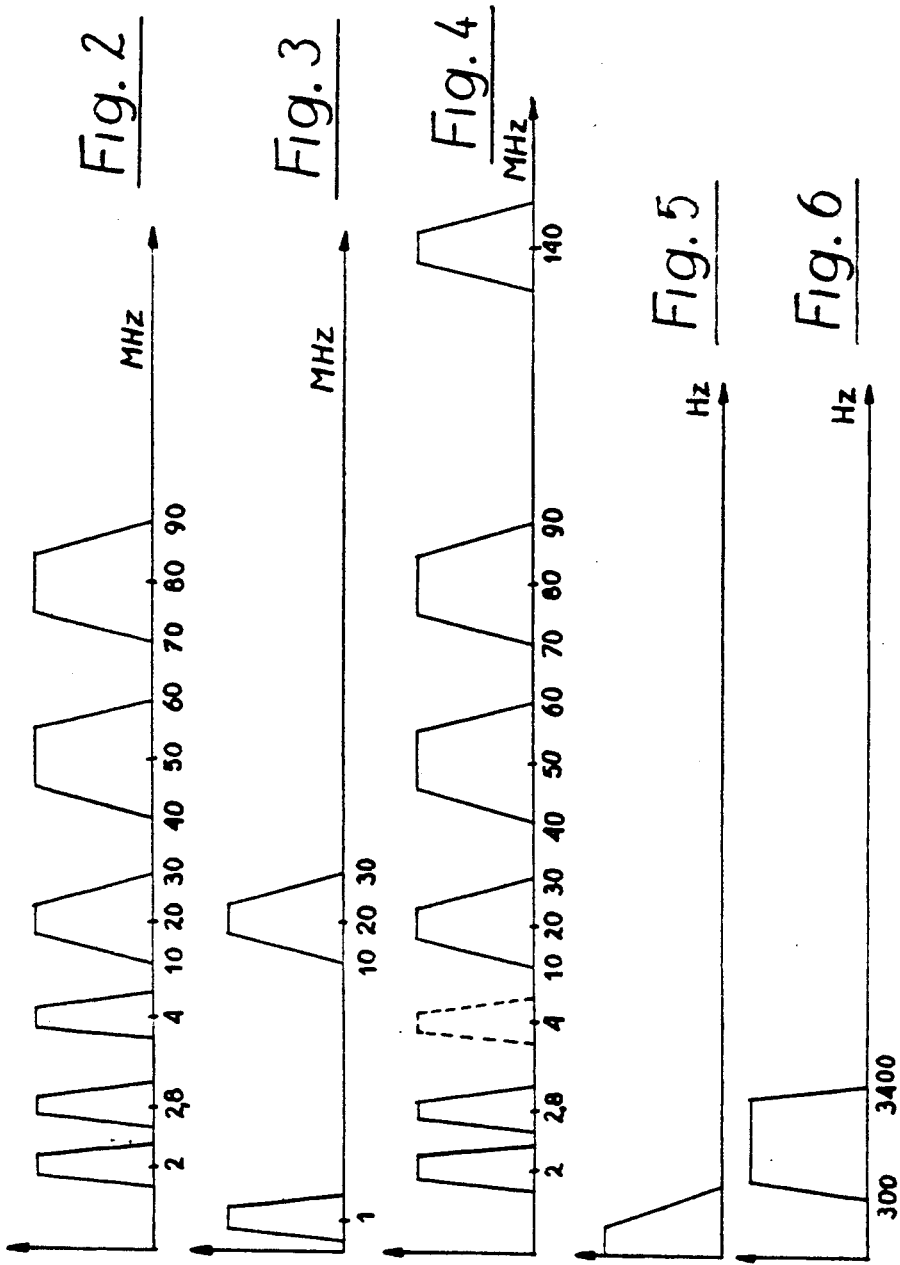

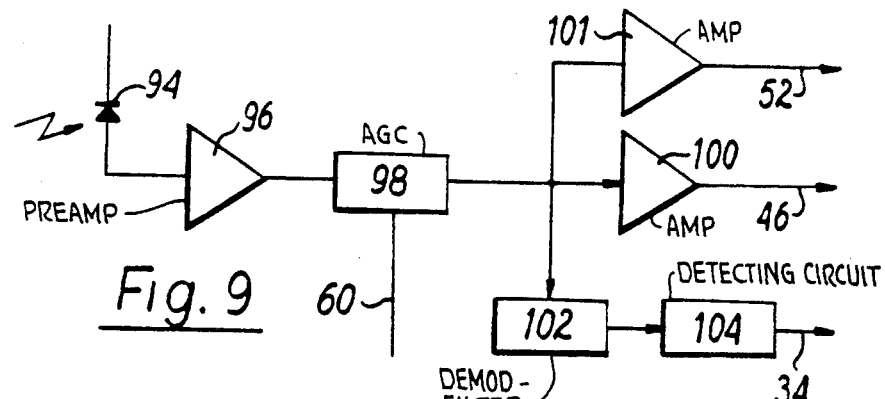
Fig. 9
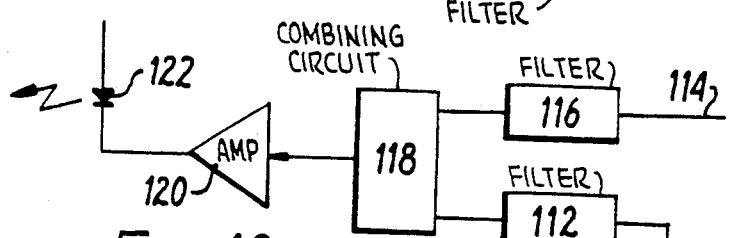
Fig. 10
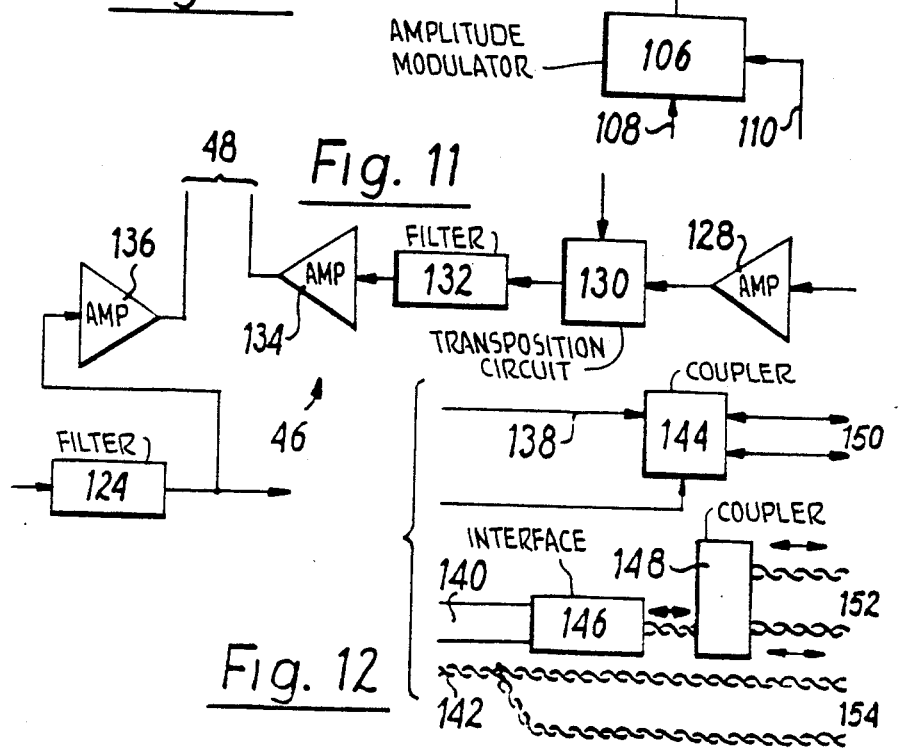
Fig. 11
Fig. 12

METHOD FOR PROCESSING DIGITAL SIGNALS, AND SUBSCRIBER STATION FOR TELECOMMUNICATION AND TELEDISTRIBUTION

FIELD OF THE INVENTION

The invention relates to a method for processing digital signals, and a subscriber terminal, for telecommunication and distribution networks. It especially relates to an equipment disposed between a fiber optic communication cable and terminals of different types.

BACKGROUND OF THE INVENTION

Recent development of communication and distribution networks giving a large access to videophone and other services through cheap fiber optics networks, requires cheap and versatile specific equipment.

PRIOR ART

The paper presented to International Switching Symposium, September 1981 "Multiservice subscriber connection terminal for local digital networks" by Andry et al. discloses a terminal including a management unit comprising a multiplexer-demultiplexer disposed between subscriber line and a coding-decoding circuit connected to a telephone set. Link management circuit controls the global operations. This apparatus processes only digital signals exchanges between a subscriber having several terminals and a switching network. The operations of such an equipment include only switching of different data signals transmitted by subscriber line to different terminals. Signals exchanges between switching network and subscriber equipment are electrical digital ones.

OBJECTS OF THE INVENTION

The invention relates to signal exchanges between switching networks and subscriber equipments through fiber optic lines, and especially videophone signal exchanges, such signals including digital audio signals and video signals.

The following specification substantially discloses the invehtion as applied to a communication and distribution system in which subcribers having videophone terminal, one or several television terminals and a hifi sound amplifier may receive distributed services as television or hifi sound program services, and switched services (point to point connection) as phone, videophone services and data bases looking up. Subscribers are connected to switching and distribution network through two optical fibers, one forming an incoming circuit and the other an outgoing circuit. The invention especially relates to processing signals transmitted from a first optical fiber to terminals and from terminals to a second optical fiber.

An object of the invention is a method and apparatus for analog signal processing, as filtering, frequency transposition, etc. . . . and moreover for processing digital signals representative of either audio signals or control or request signals defining different exchange operation conditions.

An other object of the invention is a subscriber equipment for receiving distributed program services, as television or hifi sound program and switched services signals which are on the one hand telephone signals and on the other hand videophone signals, videophone sound being transmitted as digital signals with control signals, all signals being transmitted by one and a same optical fiber, a specific frequency range being allocated to each of these signals.

An other object of the invention is a subscriber station for receiving incoming signals from an optical fiber, for processing such signals in order to adapt them to the different terminals, for interrogating terminals to determine that a program request or a communication establishment request has been transmitted by a subscriber, and for transmitting through the other optical fiber, a composite signal including several signals each included in a frequency range.

An other object of the invention is a subscriber equipment structured by a highway including coaxial cable for transmitting all video signals in determined frequency ranges and two lines, one for transmitting videophone sound and the other for transmitting control and request signals exchanged between subscriber station and terminals.

An other object of the invention is to process digital signals in a subscriber station on the one hand by processing digitized audio signals and control signals separated from composite signal received through one optical fiber, and on the other hand by processing videophone sound signals and request signals from terminals and transmitted to the other optical fiber.

SUMMARY OF THE INVENTION

The invention relates to a subscriber station to be connected between on the one hand a pair of optical fibers which transmit composite optical signals representative of at least a video signal, at least a digitized audio signal and at least a global control signal, exchanged between said station and a switching center, and on the other hand at least two terminals of which at least one is for receiving a video signal and of which at least one is for receiving an audio signal, each terminal being controlled by a specific control signal and for transmitting to said station specific communication establishment request signals, at least one terminal being for transmitting an audio signal to said station, said subscriber station including:
  receiving means to be coupled to one of optical fibers and for converting an incoming composite optical signal into composite electrical signal representative of at least a video signal, at least a digitized audio signal and at least a global control signal,
  switching circuit for receiving said composite electrical signal and for separating at least a digitized audio signal and a global control signal,
  an apparatus for processing digital signals and including:
    second switching circuit for receiving at least digitized audio signal and global control signal and for separating one from the other,
    coding-decoding circuit for decoding digitized audio signal from said second switching circuit and for coding audio signal from a least one terminal for forming digitized audio signal,
    link management circuit on the one hand for receiving said global control signal from said second switching circuit and for transmitting at least a specific control signal from a terminal, and on the other hand for receiving said specific communication establishment request signal from terminals and for forming said global request signal, and first combining circuit for receiving at least digitized audio signal representative of audio signal from a terminal and at least a global request signal from said management circuit, and for forming digital signals including said digitized audio signal and said global request signal, second combining circuit, different from first combining circuit and for receiving at least a video signal from a terminal, said digitized audio signal and said global request signal from processing apparatus, and for forming an outgoing composite electrical signal, and transmitting means to be coupled to the other optical fiber and for converting said outgoing composite electrical signal into corresponding composite optical signal.

Preferably, said second switching circuit includes a biphase decoder anda demultiplexer, and said first combining circuit includes a multiplexer and a biphase coder.

Preferably, said second switching circuit and said first combining circuit constitutes a digital interface.

Said link management circuit preferably includes a microprocessor with memories and interfaces. Memories include preferably input buffer circuits for global control signals, output buffer circuits for specific control signals, input buffer circuits for specific request signals, output buffer circuits for global request signals and buffer circuits for intermediate signals. Interfaces preferably include a first interface for exchanging global signals at a first rate and a second interface for exchanging specific signals at a second rate.

In an embodiment, said subscriber station includes a periodical scanning circuit for successively determining status of all terminals and for enabling transmitting request signal by any terminal.

Said subscriber station preferably includes watching circuit for controlling activation of at least part of said station, for detecting reception by processing apparatus of at least a control or a request signal and for activating at least part of said station which is then desactivated.

Said subscriber station preferably includes test circuit for forming branch circuit inside said subscriber station as loop circuit for returning video signal from a first optical fiber to the second one.

Said subscriber station preferably includes an adapting circuit for receiving on the one hand an incoming composite electrical signal and on the other hand an incoming transposed video signal, and including:

first circuit for receiving said composite signal and for transmitting it to a terminal, and second circuit for receiving said incoming transposed video signal and including a frequency transposition circuit.

Said subscriber station preferably includes coaxial output for transmitting analog signals, especially video signals, output for digital control signals and output for analog audio signals.

In an embodiment, said subscriber station is for transmitting to a terminal, as at least a video signal from composite signal received by said station, a signal including in combination analog signals representative of pictures and a connected high quality sound.

The invention also relates to a method for processing digital control and request signals, including on the one hand receiving global control signals and forming specific control signals, and on the other hand receiving specific request signals and forming global request signals, including first conversion for converting global control signals into intermediate control signals, second conversion for converting intermediate control signals into specific control signals, third conversion for converting specific request signals into intermediate request signals and fourth conversion for converting intermediate request signals into global request signals, and temporarily storing intermediate signals, said method including, alternatively and repetitively, a first step including a first or fourth conversion or the determination of the fact that such conversion cannot be immediately carried out, and a second step including a second or third conversion or the determination of the fact that such conversion cannot be immediately carried out.

Preferably, global and specific signals are temporarily stored.

BRIEF DESCRIPTION OF THE DRAWINGS

FIGS. 2 and 3 are graphical representation of frequency spectra of signals transmitted by receiving and transmitting optical fibers respectively.

FIGS. 4, 5 and 6 are graphical representations of spectra of signals transmitted by a coaxial highway, a digital signal transmitting line and an audio signal transmitting line respectively, said lines being connected between said subscriber station and some terminals.

FIGS. 9 and 10 are block diagrams of receiving and transmitting optical heads respectively of a subscriber station.

FIG. 11 is a block diagram of videophone adapting circuit of station of FIG. 7.

FIG. 12 is a block diagram of flat junction of a station of FIG. 7.

DETAILED DESCRIPTION OF THE BEST MODE

Figure 1:
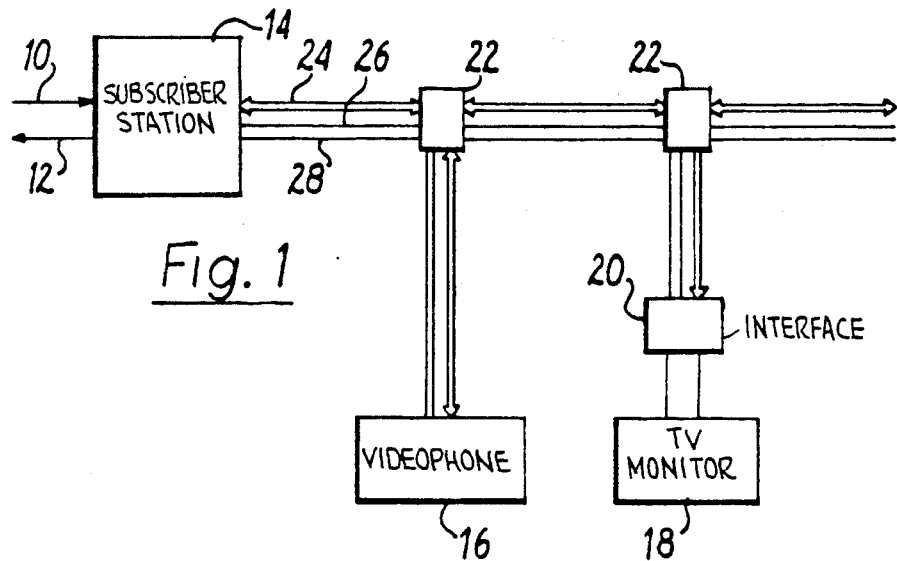
FIG. 1 is a block diagramm of main components of a subscriber equipment according to the invention.

Main features of telecommunication and teledistribution systems including subscriber stations according to the invention are first considered. Subscriber equipment is connected to switching or connecting center by a first receiving optical fiber 10 and a second transmitting optical fiber 12. These fibers are connected to a subscriber station 14 in which received optical signals are converted into electrical signals and suitably processed and in which signals from terminals as 16, 18 are processed and converted into optical signals before transmission by fiber 12. In an example, terminals are a videophone 16 and a television monitor 18. Said monitor is connected through interface module 20. Each terminal is connected through connection box 22 to a highway including coaxial line 24 and two other lines 26 and 28, preferably as symmetrical pairs. As the system including subscriber equipment provides for many services and for transmitting very different signals, it is primordial that these signals do not introduce mutual disturbances.

The system provides for bilateral videophone services, a video signal and an audio signal being transmitted by fiber 10, and a video signal and an audio signal being returned by fiber 12. Such system also distributes television and moving pictures programs. These programs can be selected between 15 or 30 by example and fiber 10 can transmit at maximum two different television signals over said video videophone signal. Said system also transmit stereophonic programs one of which can be selected by subscriber and can then be transmitted by fiber 10, with other signals.

Of course, signals exchanged between connected center and subscriber are added to previously indicated signals for establishment and supervision of communications, and for various functions as telemaintenance, telesurveying, etc. . . .

In an example, FIGS. 2 and 3 show how these different signals are transmitted.

Hifi sound signal is frequency modulated on two subcarriers at 2 and 2,8 MHz, for right and left channels respectively. 75 kHz frequency excursion easily allows modulation by audio frequency signals in baseband from 40 Hz to 15 kHz.

A digital signal is transmitted with 128 kbit/s rate and includes pulse coded modulated videophone audio signal at 64 kbit/s and data channel at 64 kbit/s. This biphase coded signal amplitude on-off modulates a subcarrier at a frequency near 4 MHz. Preferably, this signal breaks biphase modulation every 64 bits for detection of timing of the two digital trains.

Videophone signal is frequency modulated by standardized video signal, on a subcarrier at 20 MHz.

FIG. 2 also shows that a first television signal is frequency modulated on a subcarrier at 50 MHz. This modulation is provided for in a known manner from a standardized video signal with audio signal previously frequency modulated on a subcarrier at 7,5 MHz. It is also to be noted that videophone audio signal may be preferably joined to corresponding video signal as just described for television signal. Subscriber can then receive high quality sound on videophone terminal.

A second television signal is frequency modulated on a subcarrier at 80 MHz, as described for first television signal.

Signals transmitted by optical fiber 12 from subcriber station to connecting center are in smaller number. Indeed, they simply include digital signals modulated on a subcarrier at a frequency near 1 MHz, and they constitute a signal with 128 kbit/s rate and quite similar to digital signals received through fiber 10.

Outgoing optical fiber 12 also transmit videophone signal quite similar to signal transmitted by receiving fiber 10, as it is modulated similarly on a 20 MHz subcarrier.

FIGS. 4 to 6 show frequency spectra of signals exchanged between a subscriber station and terminals. These signals are transmitted by coaxial highway (FIG. 4), by a first line constituted by a symmetrical pair (FIG. 5) and by a second line constituted by asymmetrical pair (FIG. 6).

Coaxial highway transmits some signals which, as electrical ones, correspond to signals received from fiber 10. These signals are the following:
signals of two hifi sound channels, modulated on 2 and 2,8 MHz subcarriers,
received videophone signals modulated on 20 MHz subcarriers, and
two television signals modulated on 50 and 80 MHz subcarriers.

Interrupted line discloses frequency range which is allocated to digital signals, in optical fibers. Digital signals are transmitted through coaxial highway but are not used. A signal is modulated on a 140 MHz subcarrier and is a transmitted videophone signal quite similar to received videophone signal, modulated on a 20 MHz subcarrier, after a frequency transposition of 120 MHz, so that said frequency range is centered on 140 MHz frequency. This frequency transposition is required because received and transmitted videophone image signals are transmitted by the same highway, in contrast with exchange between switching center and station 14 which is provided by two separated paths (fibers 10 and 12).

FIGS. 5 and 6 show that digital signals exchanged between station and terminals and audio signals are transmitted through separated lines and cannot introduce mutual disturbances.

Figure 7:
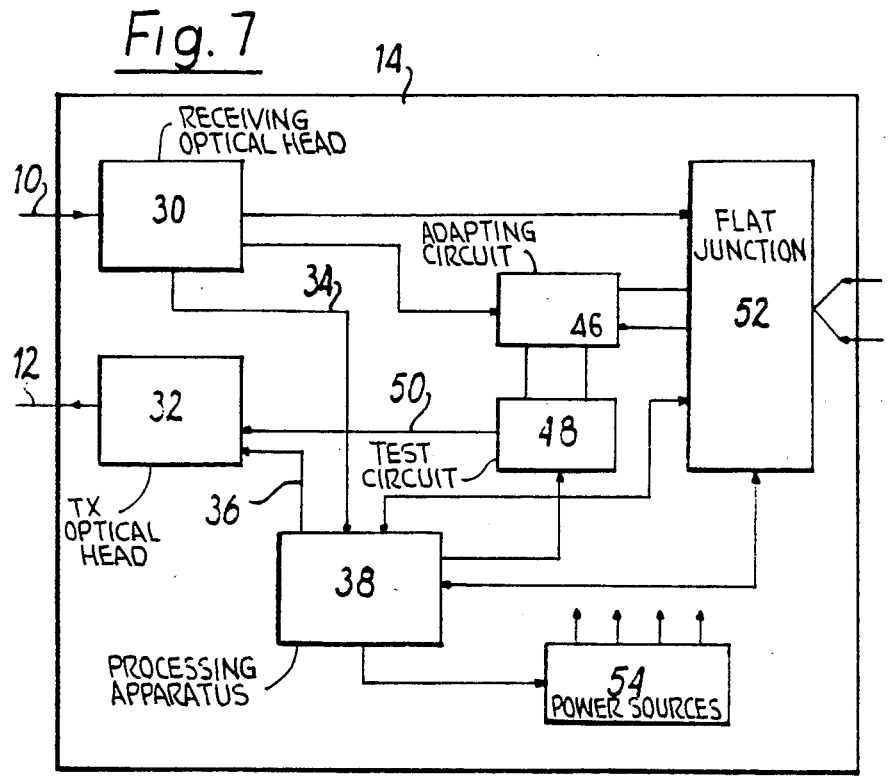
FIG. 7 is a block diagram of a subscriber station according to the invention.

FIG. 7 shows global structure of subscriber station. Said station is connected to first optical fiber 10 by a receiving optical head 30. The other optical fiber 12 is connected to a transmitting optical head 32. Heads 30 and 32 are connected through lines 34, 36 respectively to an apparatus 38 for processing digital signals, according to the invention.

Receiving optical head 30 receives a composite optical signal and constitutes a first switching circuit because it separates digital signals transmitted by line 34 from analog signals transmitted to a videophone adapting circuit 46 for filtering composite signal and for separating videophone signal only.

Test circuit 48 is connected to videophone adapting circuit 46 in such a manner that, in test mode, videophone signal separated by filtering by circuit 46 is returned to transmitting head 32 through line 50. Videophone signal received from coaxial highway through flat junction 52 is also transmitted to videophone adapting circuit 46 which provides for required frequency transposition. So, test circuit allows checking videophone transmission circuit operation, including said station.

Flat junction 52 is for coupling signals from various adapting circuits and from digital signals processing apparatus 38 to highway and various terminals.

Station 14 also includes power sources 54 including preferably watching circuit described in the following.

Digital signal processing apparatus 38 is now considered. It substantially includes digital interface 56, sound coding-decoding circuit 58 and link management circuit 60.

Digital interface 56 receives digital signals from optical head 30 through line 34 and includes biphase decoder 62 feeding demultiplexer 64. Demultiplexer 64 constitutes a switching circuit because it separates digitized audio signal, before transmission to coding-decoding circuit 58, from digital or control signal for transmission to management circuit 60.

Digital interface 56 also includes multiplexer 66 receiving digitized audio signal from coding-decoding circuit 58 and a digital signal from management circuit 60, and transmitting such signals to biphase coder 68 which feeds transmitting optical head 32 through line 36. Multiplexer 66 then constitutes combining circuit for digital signals from several sources.

Operation of biphase coder and decoder and multiplexer and demultiplexer is synchronized by time base 70 which is also connected to link management circuit 60.

Coding-decoding circuit 58 receives a signal from demultiplexer 64 and decodes it in a coder-decoder 72 before transmission to connector 64 and to flat junction. Moreover, videophone audio signal is transmitted through flat junction and connector 74 to coder-decoder 72 which converts it into digital signal and transmits it to multiplexer 66. Line at the top of connector 74 is for remote power transmission. Even after various failures, it is in fact preferable for telephone service to be continuously provided. Telephone audio signal is in fact videophone audio signal and is transmitted by circuits 62, 64, 72, 74 in one direction and 74, 72, 66 and 66 in the other direction.

Link management circuit 60 includes microprocessor 76 which exchanges informations with various circuits through data bus 78 and address bus 80. Said various circuits include HDLC interface 82, adapted to rate and format of digital signal exchanged with multiplexer 66 and with demultiplexer 64. These circuits also include a synchronous interface 84 with operating surveying, said interface being connected to flat junction 52 and being for convert digital signals into shape suitable for information exchanges with terminals.

Circuit 60 also includes a program memory 86 and data random access memory 88 with input and output circuits 90 and 92 respectively. All such circuits are known and they are not described in more detail.

So, an interface 84 provides for informations exchanged with terminals. In contrast, input and output circuits 90 and 92 are for exchanging informations with different circuits of subscriber station as described in the following. So, they are internal signals which are transmitted neither to optical fibers nor to terminals.

These various control signals allow establishment of incoming and outcoming links between subscriber station and secondary center by processing apparatus 38, following a call from said secondary center or from a terminal. Apparatus provides for dialogue with said secondary center when a link is established. It also provides for dialogue with terminals as soon as, after a periodical scanning of terminals, it has determined that a terminal has a message to transmit. When a communication is established, the apparatus interrogates terminals and provides for supervision of the complete subscriber equipment.

Preferably, input and output circuits only are permanently powered. When no communication is established, management circuit is watching. As soon as a control signal is detected from said secondary center or from a terminal, the apparatus is activated and provides for requested operations.

Circuits directly connected to digital signal processing apparatus, that is receiving and transmitting optical heads, videophone adapting circuit, flat junction, test circuit and power source, are now considered.

FIGS. 9 and 10 are block diagrams of receiving and transmitting optical heads respectively. PIN diode 94 receives composite optical signal from fiber 10 and converts it into a corresponding composite electrical signal. This signal is transmitted to preamplifier 96 and then to automatic gain control circuit 98. Circuit 98 is connected to input-output means of management circuit 60. Signal from circuit 98 is transmitted to three circuits. First, it is transmitted to amplifier 100 from which composite signal is transmitted to videophone adapting circuit 46 and to junction 52 through amplifier 101 as previously indicated referring to FIG. 7. Signal is also transmitted to circuit 102 for demodulating and filtering digital signals. This circuit is connected through detecting circuit 104 to signal processing apparatus through line 34. The head also includes a power source receiving a control signal from an output means of management circuit 60. So, said circuit is operating only when signals are received.

FIG. 10 is a block diagram of a transmitting optical head including amplitude modulator 106 which receives digital signal 108 a 128 kbit/s and a carrier 110, by example at 1,024 MHz. The signal is transmitted through filter 112 to combining circuit 118 which also receives through filter 116 signal 114 from videophone. Composite electrical signal from circuit 118 is transmitted to amplifier 120 and to photoemissive diode 122. Obviously, various circuits receive power from a source which is activated or desactivated by a signal from management circuit 60, through output means 92. So, receiving optical head constitutes a switching circuit for separating digital signals from analog and video ones. Transmitting optical head constitutes a combining circuit for digital signals and analog signal constituting video signal of videophone.

It is to be noted that, in this specification, the term "video signal" is used for defining either video signal corresponding to a standard, by example video signal SECAM, PAL, NTSC, etc. ... or a video signal modulated on a carrier or transposed in any frequency range.

Videophone adapting circuit, which exchanges the greatest number of signals with digital signal processing apparatus, is now considered as an example.

The videophone adapting module, schematically shown by FIG. 11, receives composite electrical signal from receiving optical head through filter 124 whose passband is between 10 and 30 MHz. So, only videophone signal is transmitted. Videophone signal which is to be transmitted is transposed on a carrier at 140 MHz as described referring FIG. 4. After amplifier 128, videophone signal is subjected by circuit 130 to a frequency transposition around 20 MHz. So, filter 132 whose passband is between 10 and 30 MHz, transmits a video signal suitably amplified in circuit 134 to test circuit. This test circuit also receives composite signals from output of filter 124 through amplifier 136.

Flat junction structure is now considered referring to FIG. 12. Said junction includes several parallel paths. Signal 138 from videophone adapting circuit, is transmitted to coupler 144 connected to an output 150 for connection to coaxial cable 24.

Digital signals 140 from digital signals processing apparatus are transmitted through interface 146 and coupler 148 to output 152 for connection to symmetrical pair 26. Videophone signal 142 from connector 74 is directly transmitted to output 154 for connection to symmetrical pair 28.

Other circuits of subscriber station are not detailed because the man in the art knows them. By example, power sources provide for required voltages and are controlled by said watching circuit for reducing at minimum power comsumption when communication is not established.

Management circuit, as all microprocessor circuit, preferably includes some safety or others features which increase its flexibility. By example, management circuit preferably includes a "watchdog" circuit for inhibiting closed loop uninterrupted operation.

Said subscriber station also includes test circuit which is not shown, because it simply includes selectors for providing remote controlled signal looping. However, such test circuit may be very elaborated to allow transmission of videophone signal to other terminals or transmission of television signals to videophone terminal.

Figure 13:
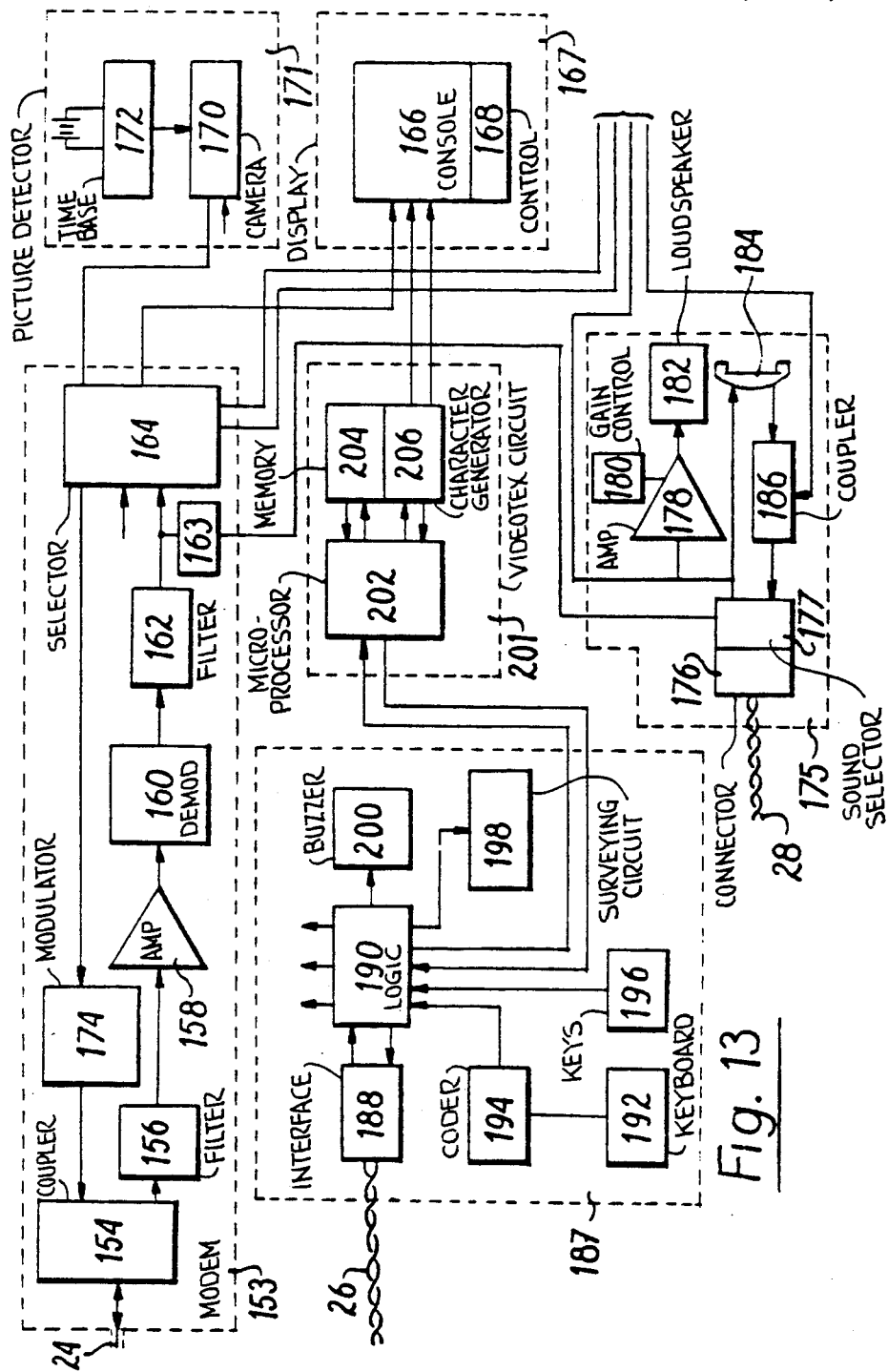
FIG. 13 is a block diagram of videophone terminal which is an example of terminal included in a subscriber equipment according to the invention.

FIG. 13 shows, as a typical terminal, the block diagram of videophone terminal. A detailed example of processing procedure executed by apparatus 38 is described in reference to this terminal in the following.

Videophone terminal first includes modulator-demodulator 153 connected to coaxial cable 24 of flat highway. This modulator-demodulator 153 successively includes coupler 154, filter 156, amplifier 158, demodulator 160, another filter 162 and, in parallel path, high quality sound demodulator 163 and picture selector 164. Signals are then transmitted to display unit 167 including a console 166 with controls 168.

Picture detector 171 includes a camera 170 and time base 172 and transmits videophone signal to selector 164. Said selector transmits said signal through modulator 174 to coupler 164.

Videophone sound is transmitted through second symmetrical pair 28 to specific equipment 175 including connector 176. Connector transmits signals to sound selector 177 also receiving high quality sound 163, and to loudspeaker 182 through amplifier 178 having gain control device 180. The signal may be also directly transmitted to earphone of telephone set 184. Microphone of telephone set returns sound to coupler 186 and connector 176 and then to subscriber station.

Videophone terminal includes control circuit 187 receiving signals from pair constituting digital bus 26. Signals are transmitted to interface 188 and to logic management circuit 190 of videophone terminal. This logic circuit is connected through coder 194 to telephone keyboard 192 and directly to function keys 196, in a known manner. Surveying circuit 198 and a buzzer 200 complete circuit 187. Logic circuit 190 is provided for transmitting various control signals, by example to power source, to picture selector, to picture parameter controls, etc. . . . It also exchanges information with microprocessor 202 of "Videotex" circuit 201 displaying data pages on display console 166. Circuit 201 includes page memory 204 and character generator 206.

Function keys 196 include by example a first key "line" which allows line catching without telephone set unhooking. Another key "picture" allows visual communication establishment when normal telephone communication has been established. A key "monitoring" allows monitoring of transmitted picture without interruption of its transmission. A key "menu" controls display of a "Videotex" information page on screen, to define access procedures to different offered services. A key "document" is used when a document is to be transmitted. A key "outside" controls transmission of a picture from an external source, as a videorecorder. Such keys are only examples which allow many operations.

Videophone terminal also allows by example access to general switched network, numbering with a keyboard, display of called numbers as inlay, display of current communication cost, as a number of tax units, line catching without unhooking, electronic ringing with selection between several melodies, etc. . . . Other services known for telephone networks can also be used.

Terminal "videophone" function allows access to optical fiber networks. Many operations can be executed, such as transmission of a picture by pushing a key, scanning of document, face to face storing, displayed picture control, frame monitoring, transmitted picture monitoring, external camera connection, external source connection, as videorecorder or television set, transfer to television monitor, etc. . . .

This terminal also allows use of "Videotex" services whose information can be displayed directly or as an inlay.

These various operations are executed by information exchanges between station and terminals through symmetrical pair constituting digital bus. Interrogations and responses are controlled by station, so that terminal logic circuit load is reduced. As described in the following in reference to figure some terminal logic circuits may be very simple.

Digital exchanges are executed in a known manner with a word structure preferably including a start bit, seven information bit, a word type identification bit, a parity bit and an end bit.

Exchanges are substantially executed according to three modes, scanning mode, control mode and "Videotex" mode. During scanning mode, interrogated terminal responds when it has recognized its identification word. Response word includes a special bit indicating to subscriber station that terminal has an information to transmit. Station then switches to control mode.

In another embodiment, said station transmits a general interrogation and a response is returned only by terminals having a message to transmit.

In control mode, station transmits identification word immediately followed by a control word. Corresponding terminal responds after control word reception.

During "Videotex" mode, messages transmitted include special identification word followed by message words in number at maximum equal to 64. Each message is followed by an identification word after which terminal acknowledges receipt.

Figure 16:
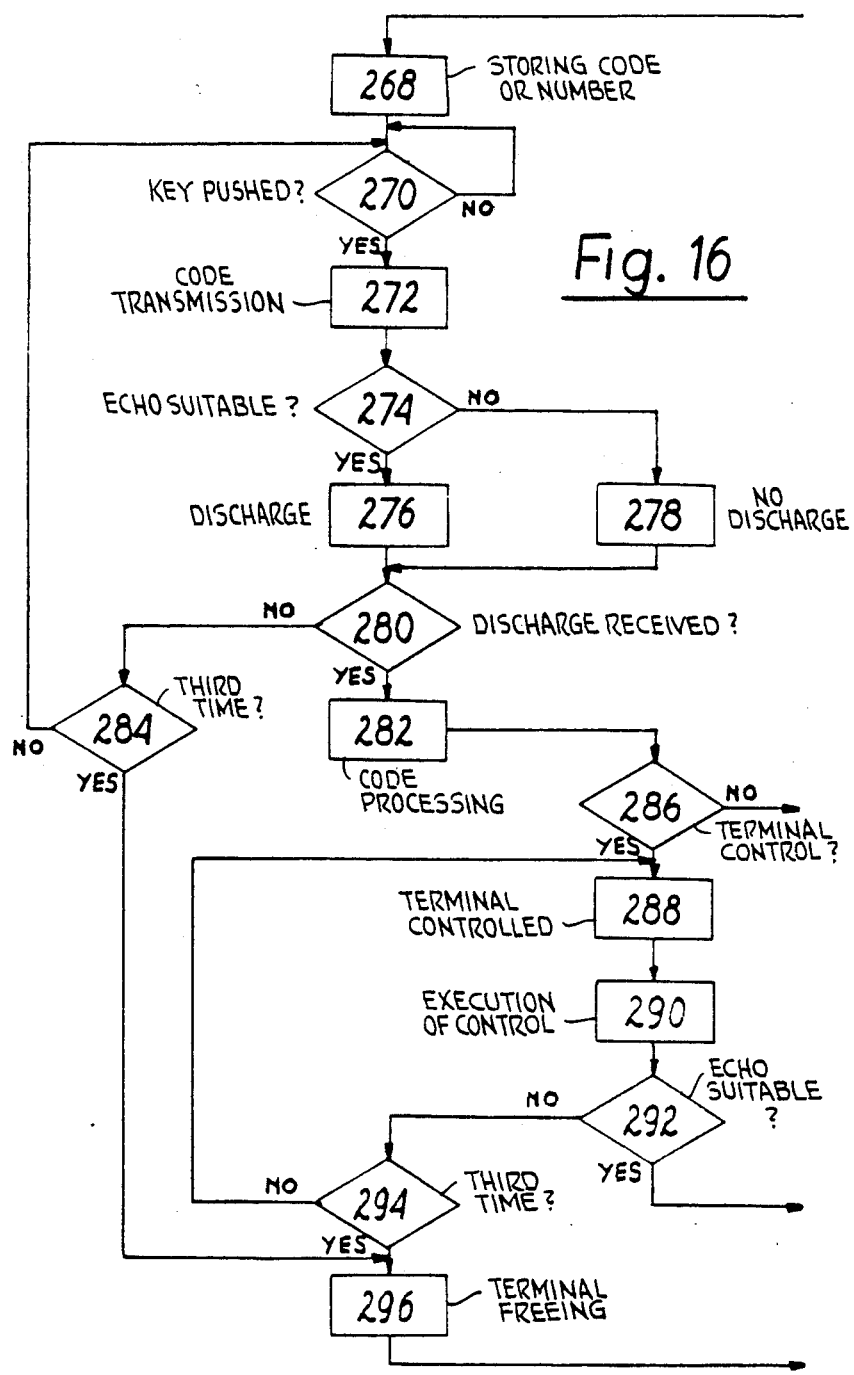
FIG. 16 is a flow diagram of an information exchange.

A typical exchange between station and a terminal is now considered referring to diagram of FIG. 16.

Operation begins at 268 by key pushing and storing key code or program number in terminal buffer circuit. Step 270 represents terminal interrogation. If terminal indicates that a key has effectively been pushed, code is transmitted to station during step 272. Station returns an echo. During step 274, terminal determines if received echo is suitable. If it is suitable, terminal gives discharge during step 276. On the contrary, terminal does not give discharge during step 278. During step 280, station determines if it has received discharge. If response is yes, station processes code during step 282. If response is no, station goes to step 284 and determines if discharge has not been received for the third time. So, station provides for three interrogations before freeing terminal.

After code processing by station, step 286 determines if code generates a terminal control. If response is yes, control is transmitted to terminal during step 288 and is executed during step 290, code echo being returned from terminal. Station determines during step 292 if received echo is suitable. If echo is not suitable, station checks during step 294 if echo has not been suitably received at least three times and then frees terminal during step 296.

Figure 14:
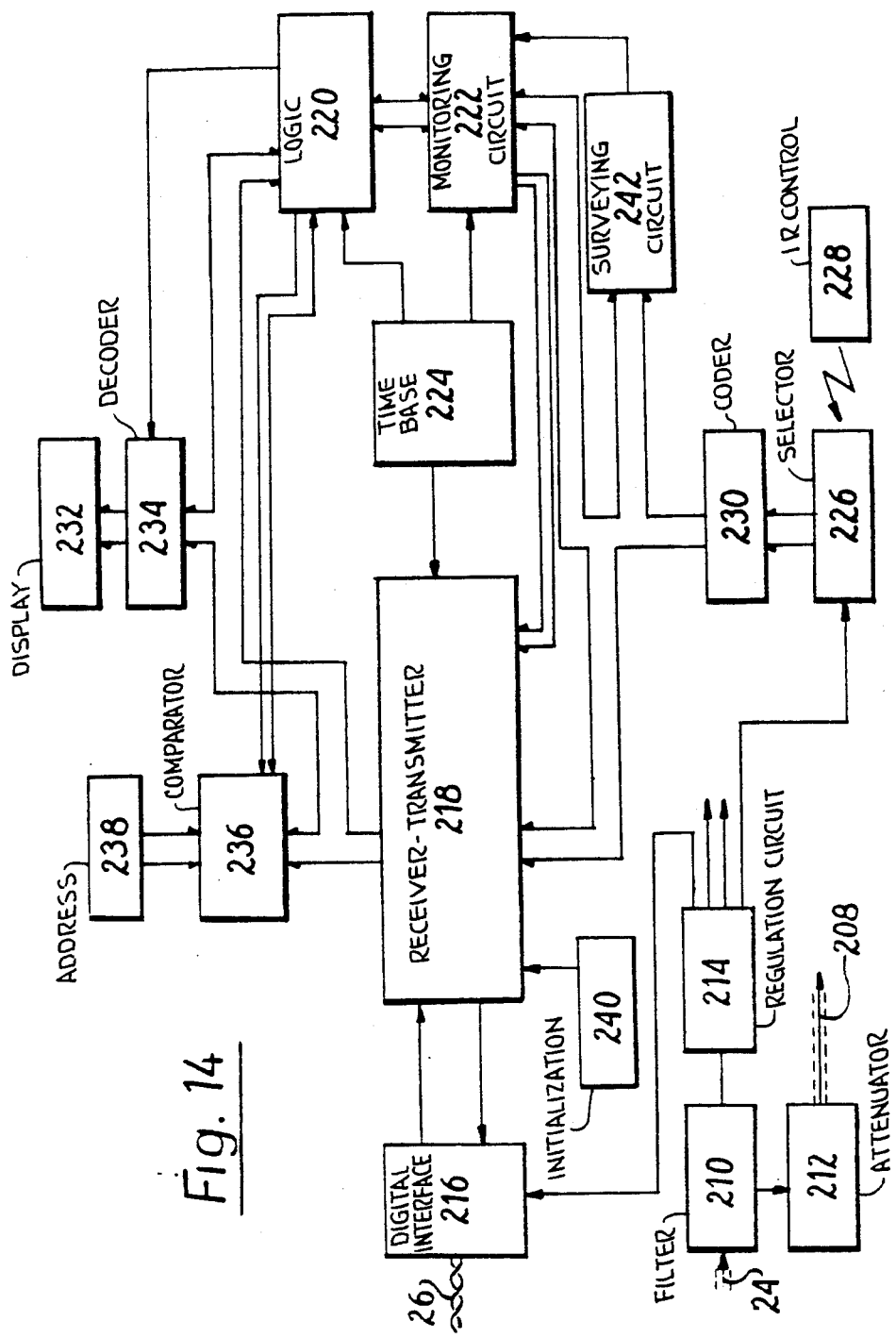
FIG. 14 is a block diagram of an embodiment of television interface circuit to be connected to a television set terminal.

As the greatest part of logic operation is executed by digital signal processing apparatus, terminal logic circuits may be reduced at minimum. This feature is now considered in reference to FIG. 14 which shows a typical television interface to be connected between highway of subscriber equipment and television monitor. Interface circuit is connected to coaxial cable 24 and feeds a coaxial cable 208 directly connected to television monitor. An alimentation filter 210 receives the signal from coaxial highway and transmits it to controllable attenuator 212 before transmission to television monitor. Filter 210 also controls regulation circuit 214 which is itself connected to various circuits shown by FIG. 14.

Digital control signal transmission line 26 is connected to digital interface 216. Said interface is connected to an asynchronous receiver-transmitter 218 associated to a reception monitoring logic circuit 220 and a transmission monitoring circuit 222. These three circuits are controlled by time base 224.

Circuit 226 is for selecting a program. It is itself controlled by infrared remote control 228 and is connected through coder 230 to receiver-transmitter 218 and to logic circuit 222.

Display device 232 indicates called program number, and is connected through decoder 234 to receiver-transmitter 218. Comparator 236 determines identification of terminal address 238. Equipment also includes initialization circuit 240 and surveying circuit 242 well known by the man in the art.

Figure 8:
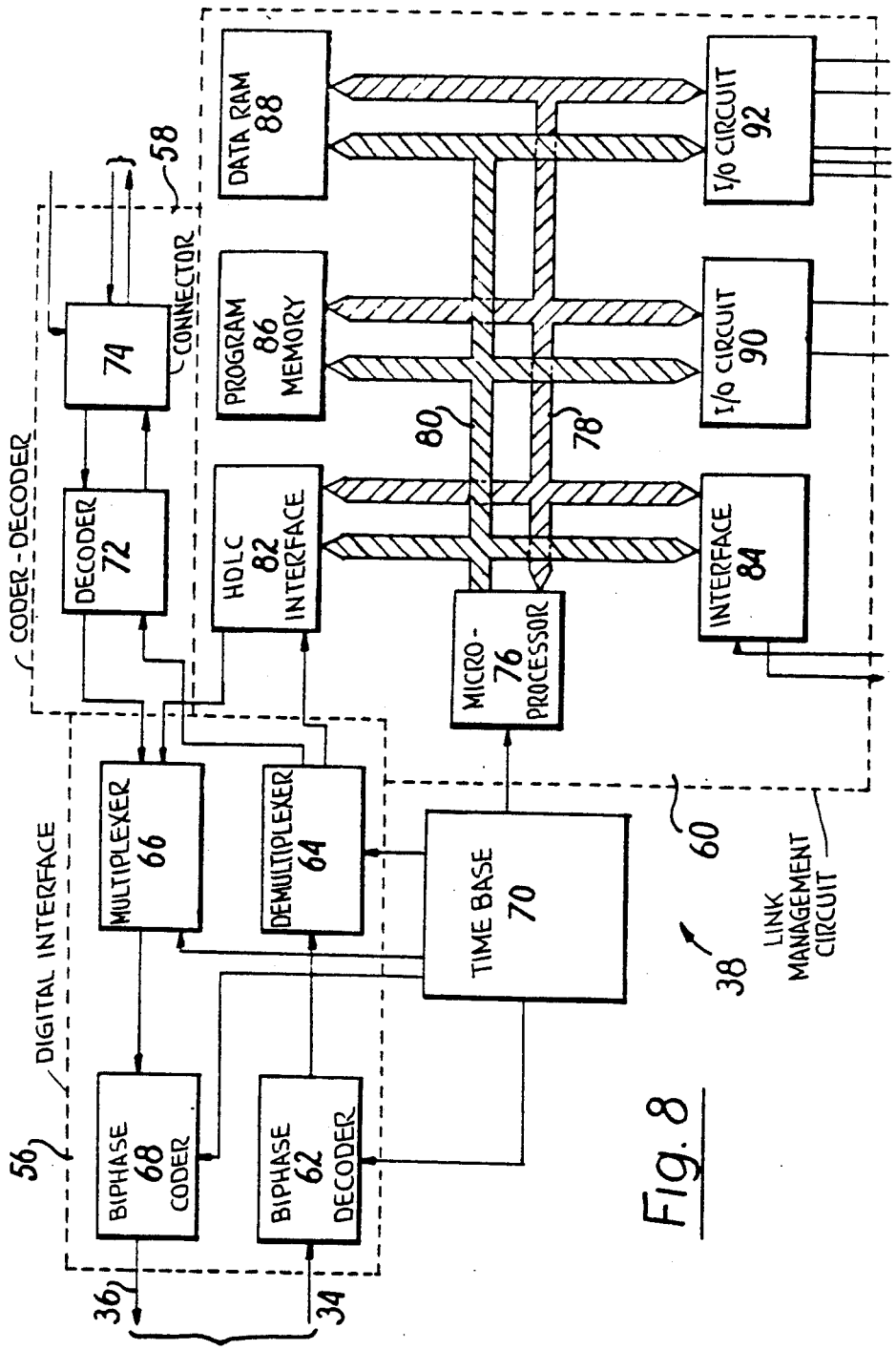
FIG. 8 is a detailed block diagram of digital signal processing circuit of FIG. 7 station.
Figure 15:
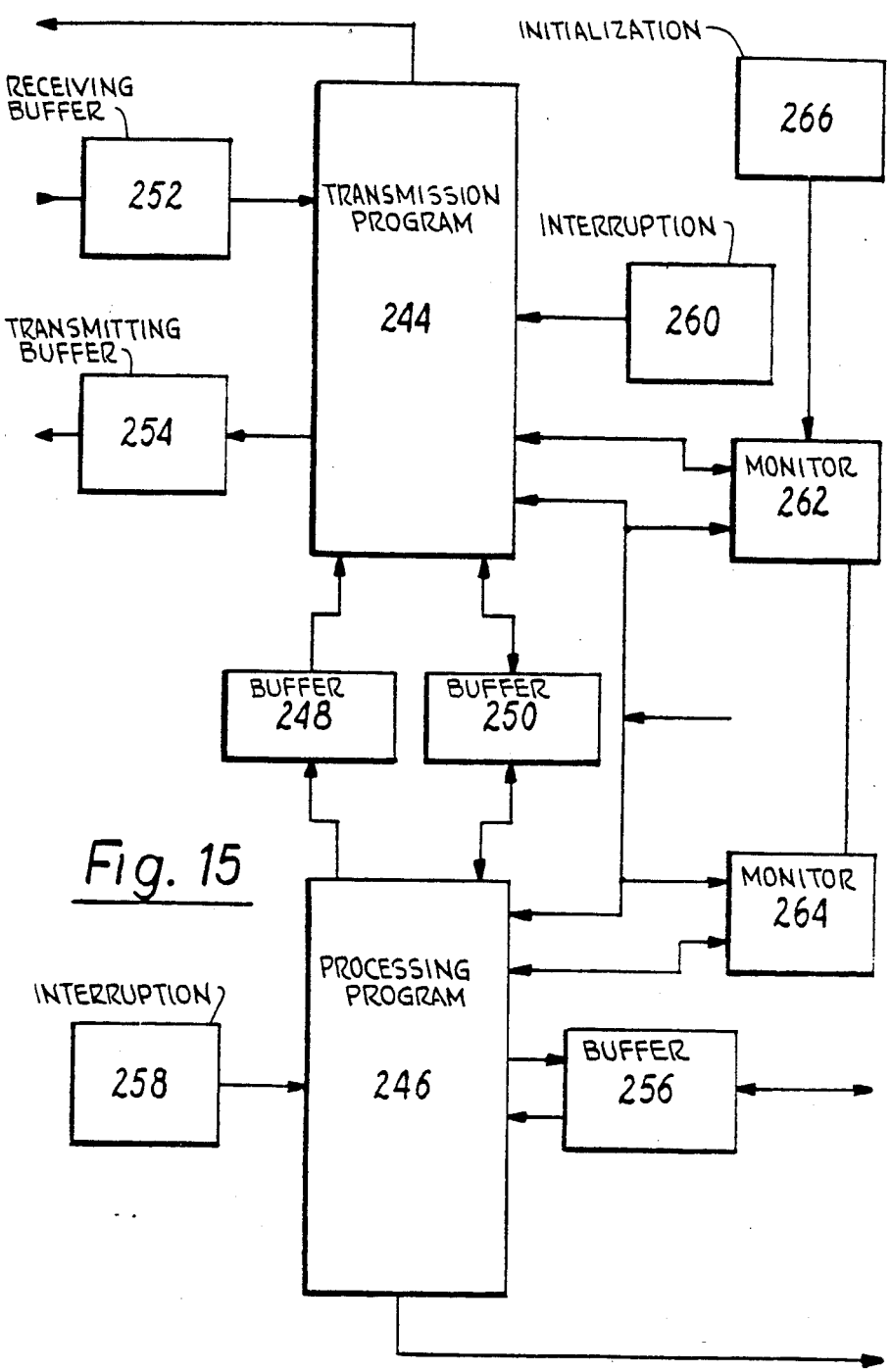
FIG. 15 is a block diagram showing general organisation of management circuit included in digital signal processing apparatus of said station according to the invention.

The operation of management circuit is now considered referring to FIG. 15. Specific components have been shown, but they may be constituted by microprocessor, memories and interfaces yet described referring to FIG. 8.

Two components 244 and 246 are shown to represent respectively transmission program and processing program of the terminal signals.

The two components are connected by buffers 248 and 250 for storing intermediate signals. Transmission program requires receiving and transmitting buffers 252 and 254 respectively, said buffers being adapted to HDLC exchanges. The other program requires a buffer 256 adapted to terminal operating rate. Interruption circuits 258 and 260 transmit request from terminals and from connecting center. Transmitting monitor 262 and processing monitor 264 for the two programs are triggered by an initialization device 266. Programs 244, 246 and monitors 262, 264 receive status information from station.

Transmission operations, that is dialogue with center, are executed by program 244, and terminal processing operations, that is subscriber equipment management and dialogue with terminals, are executed by program 246. Each of the two programs is structured by a corresponding monitor 262, 264. Information is exchanged between the two programs through buffers 248, 250 incorporated to memories 88.

By example, it is considered that monitor 262 selects a unit duty to be executed. If duty can be executed and after it has been executed, microprocessor switches to processing program to address stored in memory. If duty cannot be executed, by example because external event is waited (center response, occupied buffer . . . ), status table is modified and duty remains to be executed.

Microprocessor also switches to processing program to the address stored in memory. Processing program monitor then concatenates unit duties. If these duties meet an external event wait (terminal response, occupied buffer, . . . ), wait address is stored in memory and microprocessor switches again to transmission program.

This cyclic operation allows a higher processing rate than with two separated microprocessors.

Some operations executed by digital signal processing apparatus only have been described, but other operations as remote surveying, remote maintenance, etc. . . . may be executed in a manner well known by the man in the art.

I claim:

1. A subscriber station to be connected between, on the one hand, a pair of optical fibers for transmitting a composite optical signal representative of at least a video signal, of at least a digitized audio signal and of at least a global control signal, exchanged between said station and a swiching center, and on the other hand at least two terminals of which at least one is for receiving a video signal and of which at least one is for receiving an audio signal, each terminal being controlled by a specific control signal and being for transmitting to said station specific communication establishment request signal, at least one terminal being for transmitting an audio signal to said station, said subscriber station including:

receiving means to be coupled to one of optical fibers and for converting an incoming composite optical signal into a composite electrical signal representative of at least a video signal, of at least a digitized audio signal and of at least a global control signal, switching circuit for receiving said composite electrical signal and for separating from said composite electrical signal at least a digitized audio signal and a global control signal, an apparatus for processing digital signals and including:

second switching circuit for receiving at least digitized audio signal and global control signal and for separating one from the other, coding-decoding circuit for decoding digitized audio signals from said second switching circuit and for coding audio signals from at least one terminal for forming digitized audio signals, link management circuit on the one hand for receiving said global control signal from said second switching circuit and for transmitting at least a specific control signal from a terminal, and on the other hand for receiving said specific communication establishment request signals from terminals and for forming a global request signal, and first combining circuit for receiving at least a digitized audio signal from said coding-decoding circuit and representative of audio signal from a terminal and at least a global request signal from said management circuit and for forming digital signals including said digitized audio signal and said global request signal, second combining circuit, different from first combining circuit and for receiving at least a video signal from a terminal, said digitized audio signal and said global request signal from said first combining circuit and for forming an outgoing composite electrical signal, and transmitting means to be coupled to the other optical fiber and for converting said outgoing composite electrical signal into corresponding composite optical signal.

2. Station according to claim 1, wherein said second switching circuit includes a biphase decoder and a demultiplexer.

3. Station according to claim 1, wherein said first combining circuit includes a multiplexer and a biphase coder.

4. Station according to claim 1, wherein said second switching circuit and said first combining circuit are combined as a digital interface curcuit.

5. Station according to claim 1, wherein said link management circuit includes a microprocessor with memories and interfaces.

6. Station according to claim 5, wherein said memories include input buffer circuit for global control signals, output buffer circuit for specific control signals, input buffer circuit for specific request signals, output buffer circuit for global request signals, and buffer circuit for intermediate signals.

7. Station according to claim 5, wherein interfaces include a first interface for exchanging global signals at a first rate and a second interface for exchanging specific signals at a second rate.

8. Station according to claim 1, wherein said processing apparatus provides for periodical scanning for successively determining all terminal status and for enabling request signal transmission by any terminal.

9. Station according to claim 1, wherein said link management circuit provides for controlling activation and deactivation of at least a part of said station, for detecting reception, by said processing apparatus, of at least a control or of a request signal and for activating at least a part of said station which has been previously deactivated.

10. Station according to claim 1, further including a test circuit for forming a branch circuit inside said subscriber station as a loop circuit for receiving said video signal from said receiving means and for returning said video signal to said second combining circuit.

11. Station according to claim 1, further including an adapting circuit connected to said receiving means for receiving an incoming composite electrical signal and to a terminal for receiving an incoming transposed video signal, said adapting circuit including first circuit for receiving said composite signal and for transmitting it to a terminal, and second circuit for receiving said transposed video signal and including a frequency transposition circuit.

12. Station according to claim 11, further including a flat junction connected to said receiving means, to said adapting circuit and to said processing apparatus and having a coaxial output for transmitting analog signals, an output for digital control signals and output for analog audio signals.

13. Station according to claim 1, wherein said at least a video signal from composite signal received by said station is videophone signal including in combination analog signals representative of pictures and of connected high quality sound.

14. Method for processing control on the one hand received global control signals into specific control signals, and on the other hand received specific request signals into global request signals, including steps selected between a first conversion step for converting global control signals into intermediate control signals, a second conversion step for converting said intermediate control signals into specific control signals, a third conversion step for converting specific request signals into intermediate request signals, a fourth conversion step for converting intermediate request signals into global request signals, and a step of temporarily storing intermediate signals, said method including successively a first step which is either a step selected between said first and fourth conversion or the determination of the fact that such conversion step cannot be immediately carried out, a second step which is either a step selected between said second and third conversion or the determination of the fact that such conversion cannot be immediately carried out, and, alternatively and repetitively, said first and second steps.

15. Method according to claim 14, further including temporarily storing global and specific signals.

* * * * *